Nov. 20, 1951 — O. F. BRYANT — 2,575,547

MILEAGE DEVICE

Filed July 28, 1949

Inventor

Otis F. Bryant

By Clarence A. O'Brien and Harvey B. Jacobson

Attorneys

Patented Nov. 20, 1951

2,575,547

UNITED STATES PATENT OFFICE 2,575,547

MILEAGE DEVICE

Otis F. Bryant, Bismarck, N. Dak.

Application July 28, 1949, Serial No. 107,232

3 Claims. (Cl. 116—133)

This invention comprises novel and useful improvements in a mileage device and more specifically pertains to a mileage indicator which may be manually adjusted to indicate any desired mileage and is adapted for convenient mounting upon the visor of a motor vehicle.

The primary purpose of this invention is to provide a mileage indicator which shall be of simple construction, of light weight, may be readily attached to or removed from the sun visor of a motor vehicle by an elastic cord, and wherein the elastic cord fastening means also serves to define a reference zone for viewing the indicia of the indicator.

An important feature of the invention resides in the provision of a manually adjustable indicator or register consisting of a base plate upon which is mounted a plurality of superimposed decagonal disks of progressively diminishing size, together with a further disk mounted upon the other side of the base and all rotatable about a common axis consisting of a common fastening and pivot pin.

A still further feature of the invention resides in the provision of a device as set forth in the preceding feature in which the base plate is provided with an opening and in which the further disk is provided with indicia selectively registering with the opening to designate tenths of a mile, these latter indicia being of a distinctive or different coloration from those of the decagonal disks on the front of the base plate.

These, together with various ancillary features and objects of the invention which will later become apparent as the following description proceeds, are attained by the present device, a preferred embodiment of which has been illustrated by way of example only in the accompanying drawings, wherein.

Figure 1:
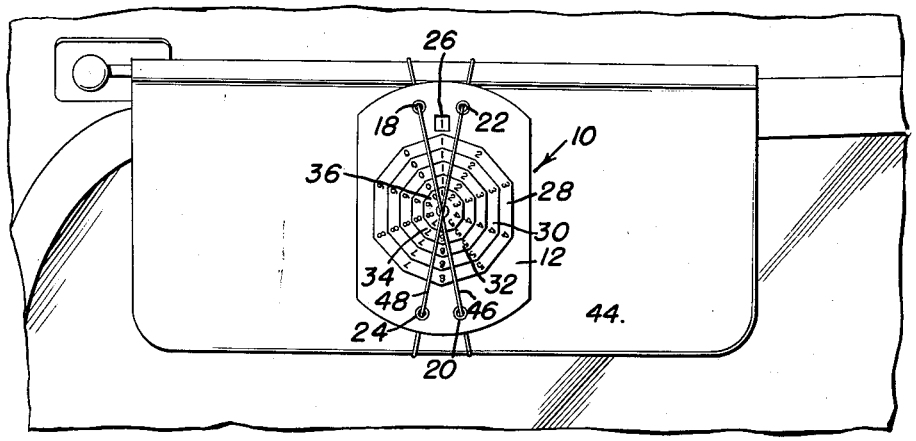
Figure 1 is an elevational view showing a preferred embodiment of the invention mounted in an operative position in a motor vehicle upon the sun visor thereof.
Figure 2:
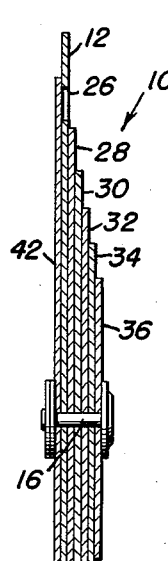
Figure 2 is a vertical transverse sectional view taken through the embodiment of Figure 1 and through the axis of rotation of the disks thereof.
Figure 3:
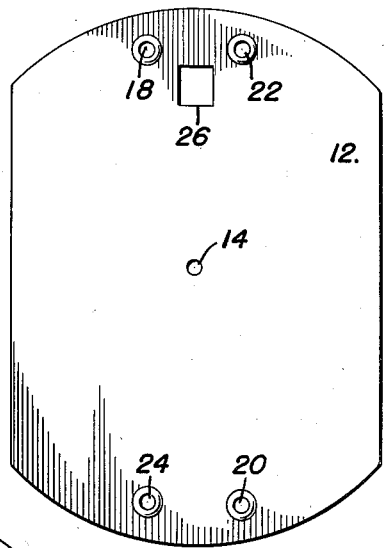
Figure 3 is an elevational view of the base plate of the device.
Figure 4:
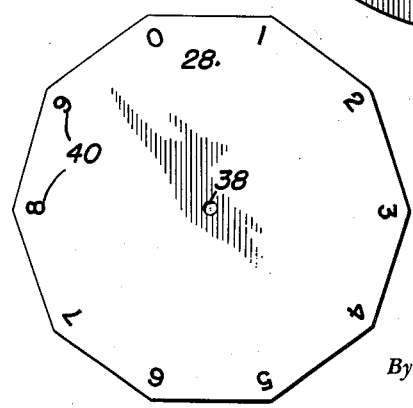
Figure 4 is an elevational view of one of the decagonal disks forming a part of the invention.

Referring now more specifically to the accompanying drawings, wherein like numerals designate similar parts throughout the various views, it will be seen that the device, designated generally by the numeral 10, includes a base plate 12 which may be of any suitable size and material, and which is provided with a centrally disposed aperture 14 for the reception of a retaining and pivot pin 16.

The base plate 12 is provided with a pair of diametrically disposed eyelets or apertures 18 and 20 in one pair and 22 and 24 in the other pair, these diametrical pairs of apertures being spaced from each other through any desired angular interval for a purpose to be later apparent.

Preferably adjacent its upper edge and at any convenient position thereon, the base plate 12 is provided with an opening or aperture 26 which constitutes a viewing or scanning aperture for a purpose which will be later apparent.

A series of superimposed decagonal shaped disks, of any desired number, and which are illustrated in Figure 1 at 28, 30, 32, 34 and 36, are disposed in superimposed relation and are pivotally secured to the base plate 12 by the above mentioned fastening and pivot pin 16 which extends through suitable apertures 38 disposed centrally of each disk. At equally spaced peripheral intervals, such as at the apices thereof, each of the disks is provided with a series of digits 40, running from zero to 9, inclusive.

As shown in Figure 1, the disks are progressively of diminishing size from the base plate outwardly, whereby the periphery of each disk may be observed, as will be apparent from Figure 1. Likewise secured by the pivot pin 16 to the rear side of the base plate 12 is a further disk 42 which may be decagonal or of any other shape as desired, and which is likewise provided with a series of digits from zero to nine inclusive disposed at equal angular intervals and positions for successive registry with the viewing or scanning opening 26. Preferably, the digits upon the further disk 42 of a distinct coloration such as red, whereby the same may designate tenths of a mile.

The device is adapted to be attached removably to any convenient part of a motor vehicle such as a sun visor 44 thereof as by means of cords 46 and 48 which extend through diametrically disposed apertures 18 and 20, and 22 and 24, these cords being preferably of an elastic nature, such as rubber bands or the like, so that the same may be stretched to resiliently embrace and secure the device to the visor 44 as illustrated. It should be observed that elastic cords not only secure the device in position, but also serve as a reference frame or zone to define a wedge-shaped area of the series of disks, upon which the various mileage digits may be read.

As will be readily understood, each of the disks will designate a speedometer mileage digit, and by varying the number of disks, the range of mileage which it is possible to register will be correspondingly varied. Further, one or more of the disks may be distinctive coloration to facilitate the reading of various types of mileage thereon.

It is contemplated that the device may be employed to indicate the speedometer mileage of the last oil change, of various trips, of gasoline mileage, and the like, as desired. There have been shown in the example illustrated five disks on the front of the base plate, in addition to a sixth disk which registers tenths of miles. These five disks thus permit the registration of $99,999\frac{9}{10}$ miles and this may be varied by $\frac{1}{10}$ of a mile intervals throughout the entire range from zero to this number.

It is observed that the individual disks may be readily adjusted or set by hand, to bring any desired mileage designating indicia within the reference zone formed by the crossed retaining cords 46 and 48.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having thus disclosed and described the invention, what is claimed as new is as follows:

1. A mileage indicator comprising a base, a series of decagonal disks superimposed and pivoted to said base for rotation about a common axis, a series of digits ranging from zero to nine respectively evenly spaced upon the surface of each disk adjacent the edge thereof, means for both mounting said device and establishing a reference zone on said series of disks, said last means comprising cords crossing said disks at their common axis and defining wedge-shaped reference zones.

2. A mileage indicator comprising a base, a series of decagonal disks superimposed and pivoted to said base for rotation about a common axis, a series of digits ranging from zero to nine respectively evenly spaced upon the surface of each disk adjacent the edge thereof, means for both mounting said device and establishing a reference zone on said series of disks, said last means comprising cords crossing said disks at their common axis and defining wedge-shaped reference zones, said cords being of elastic material.

3. A mileage indicator comprising a base, a series of decagonal disks superimposed and pivoted to said base for rotation about a common axis, a series of digits ranging from zero to nine respectively evenly spaced upon the surface of each disk adjacent the edge thereof, means for both mounting said device and establishing a reference zone on said series of disks, said last means comprising cords crossing said disks at their common axis and defining wedge-shaped reference zones, said base plate having pairs of diametrically disposed apertures relative to said common axis, said cords being threaded through said apertures.

OTIS F. BRYANT.

REFERENCES CITED

The following references are of record in the file of this patent:

UNITED STATES PATENTS

| Number | Name | Date |
|---|---|---|
| 602,053 | Brodie | Apr. 12, 1898 |
| 1,555,575 | Hogsten et al. | Sept. 29, 1925 |
| 1,662,503 | Kreiger | Mar. 13, 1928 |